US010563629B2

(12) United States Patent
Schwab

(10) Patent No.: US 10,563,629 B2
(45) Date of Patent: Feb. 18, 2020

(54) RAILWAY TRACTION VEHICLE WITH A MODULAR FUEL GAS TANK

(71) Applicant: ALSTOM TRANSPORT TECHNOLOGIES, Saint-Ouen (FR)

(72) Inventor: Wolfram Schwab, Kiel (DE)

(73) Assignee: Alstom Transport Technologies, Saint-Ouen (FR)

( * ) Notice: Subject to any disclaimer, the term of this patent is extended or adjusted under 35 U.S.C. 154(b) by 432 days.

(21) Appl. No.: 15/094,837

(22) Filed: Apr. 8, 2016

(65) Prior Publication Data

US 2016/0297451 A1 Oct. 13, 2016

(30) Foreign Application Priority Data

Apr. 9, 2015 (EP) ..................................... 15305522

(51) Int. Cl.
*B61C 17/02* (2006.01)
*F02M 37/00* (2006.01)
(Continued)

(52) U.S. Cl.
CPC ......... *F02M 37/0088* (2013.01); *B60K 15/03* (2013.01); *B61C 3/00* (2013.01);
(Continued)

(58) Field of Classification Search
CPC .. B61C 17/00; B61C 3/00; B61C 5/00; B61C 17/02; B60K 15/03; F02M 37/007; F02M 37/0088
See application file for complete search history.

(56) References Cited

U.S. PATENT DOCUMENTS 7,966,945 B1 * 6/2011 Miller ..................... B61C 7/04
105/35
2013/0199406 A1 * 8/2013 Kanda .................. B60L 11/123
105/35
(Continued)

FOREIGN PATENT DOCUMENTS

EP 2783938 A1 10/2014

OTHER PUBLICATIONS

Extended European Search Report dated Oct. 28, 2015 in corresponding application No. 15305522.3.

*Primary Examiner* — Scott A Browne
(74) *Attorney, Agent, or Firm* — Knobbe, Martens, Olson & Bear, LLP

(57) ABSTRACT

A railway traction vehicle comprising a plurality of axles, a fuel gas power unit (112), a fuel gas storage assembly (118) including a predetermined number of fuel gas storage modules (122), and a fuel gas delivery network (120). The fuel gas storage assembly (118) comprises a plurality of identical fuel gas storage module receiving devices (124), and, for each of said receiving devices, an identical fuel gas coupling (126) for coupling a module (122) with said network (120). The modules (122) share a standardised configuration such that each of them can be received in any of said receiving devices (124) and coupled to the corresponding fuel gas coupling (126). They are distributed over said fuel gas storage module receiving devices (124) such that the load on the axles is optimised. The predetermined number is adapted to the amount of fuel gas needed by the vehicle to operate on a predetermined railway line. Preferred application to regional passenger multiple units.

10 Claims, 2 Drawing Sheets

(51) Int. Cl.
*B61C 17/00* (2006.01)
*B60K 15/03* (2006.01)
*B61C 5/00* (2006.01)
*B61C 3/00* (2006.01)

(52) U.S. Cl.
CPC ............... *B61C 5/00* (2013.01); *B61C 17/00* (2013.01); *B61C 17/02* (2013.01); *F02M 37/007* (2013.01)

(56) References Cited

U.S. PATENT DOCUMENTS

| | | | | |
|---|---|---|---|---|
| 2014/0261073 | A1* | 9/2014 | Cook | F01N 3/20 105/392.5 |
| 2014/0318410 | A1* | 10/2014 | Kral | B60R 16/02 105/50 |
| 2015/0367736 | A1* | 12/2015 | Salomonsen | B61O 5/00 105/35 |
| 2016/0167677 | A1* | 6/2016 | Schaefer, Jr. | B61C 17/06 105/35 |
| 2017/0145961 | A1* | 5/2017 | Myers | F02M 21/0296 |

* cited by examiner

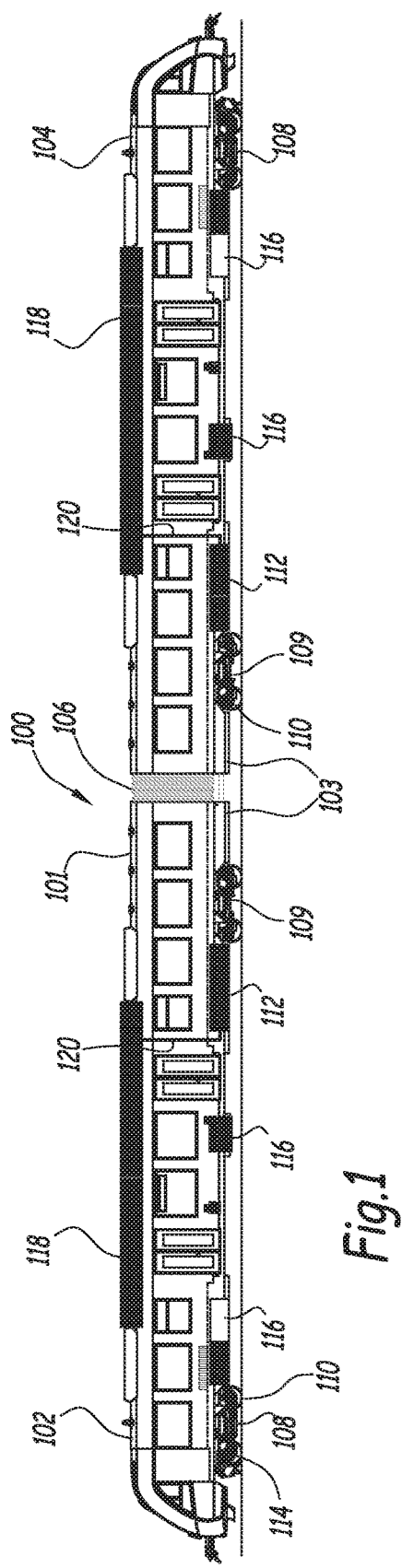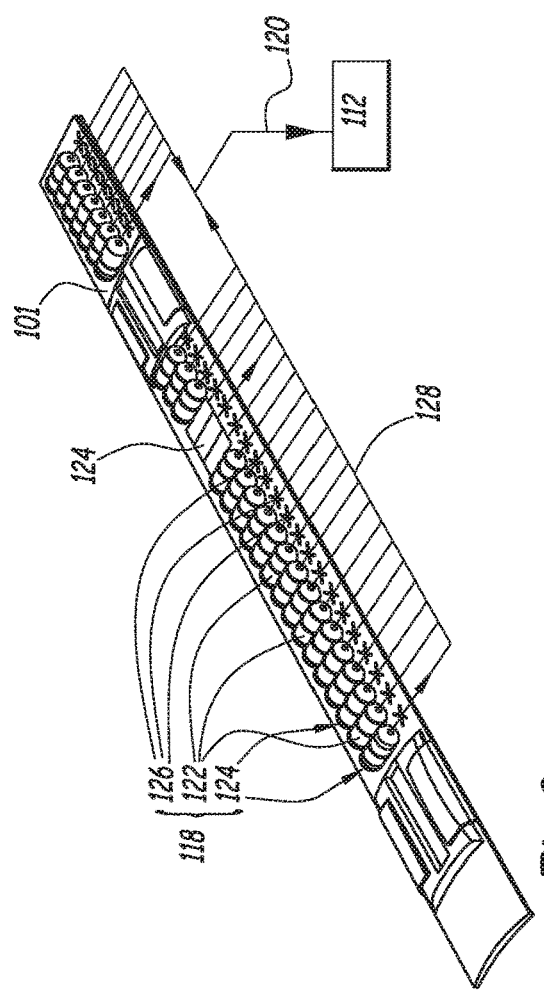

RAILWAY TRACTION VEHICLE WITH A MODULAR FUEL GAS TANK

CROSS-REFERENCE TO RELATED APPLICATIONS

This application claims priority to European Patent Application No. 15305522.3 filed on Apr. 9, 2015, the disclosure of which including the specification, the drawings, and the claims is hereby incorporated by reference in its entirety.

FIELD OF THE INVENTION

The present invention relates to a railway traction vehicle comprising:
 a plurality of axles;
 a power unit adapted to generate at least a part of the vehicle's traction power using fuel gas;
 a fuel gas storage assembly adapted to provide fuel gas to the power unit and including a predetermined number of fuel gas storage modules; and
 a fuel gas delivery network for delivering fuel gas from the fuel gas storage assembly to the power unit.

BACKGROUND OF THE INVENTION

Such a railway traction vehicle is known and shown in FIG. 3 of WO 2014/126480 A1. This known railway traction vehicle includes a carriage 50 and a locomotive 10 hauling carriage 50. Carriage 50 may be equipped with a hydrogen driven fuel cell 53 that generates electricity inter alia for the locomotive's electric traction motors 15. Hydrogen storage tanks 52 may be installed on the roof of carriage 50 that supply fuel cell 53 with hydrogen.

Since the hydrogen is stored in the storage tanks 52 at high pressure, the storage tanks 52 must be sturdy. Accordingly, they are very heavy. The presence of the heavy storage tanks 52 on the carriage's roof substantially increases the railway traction vehicle's fuel consumption. Furthermore, this large weight leads to an unfavourable load distribution on the carriage's axles.

Document EP 2 423 067 A1 discloses in its FIGS. 10 to 12 a diesel-electric locomotive 100 including two heavier inner operating modules 122, 123 and two lighter outer operating modules 119, 121. The operating modules may be electrically connected via a collecting rail 160. This document does however not deal with the storage of fuel gas on a railway traction vehicle.

SUMMARY OF THE INVENTION

In view of the above-described drawbacks of the prior art it is an object of the present invention to provide a railway traction vehicle having a fuel gas driven power unit and a corresponding fuel gas storage assembly with reduced fuel consumption and an improved load distribution on its axles.

This object is achieved with the above-defined railway traction vehicle in that:
 the fuel gas storage assembly comprises:
  a plurality of identical fuel gas storage module receiving devices, each receiving device being adapted to receive one fuel gas storage module; and
  for each of said receiving devices, an identical fuel gas coupling for coupling a fuel gas storage module received in the receiving device with said fuel gas delivery network,
 said fuel gas storage modules:
  share a standardised configuration such that each of them can be received in any of said receiving devices and coupled to the corresponding fuel gas coupling, and
  are distributed over said fuel gas storage module receiving devices such that the load on the railway traction vehicle's axles is optimised, and
 said predetermined number of fuel gas storage modules is adapted to the amount of fuel gas needed by the railway traction vehicle to operate on a predetermined railway line,
 wherein the railway traction vehicle includes a guiding arrangement, preferably including two parallel guide rails, in which the receiving devices are displaceably guided.

Thanks to the standardised configuration of the fuel gas storage modules and the complementary receiving devices and fuel gas couplings, the position of the fuel gas storage modules on the railway traction vehicle can be adapted to optimise the load on the railway traction vehicle's axles. For example, one or several modules can be switched from one receiving device to another in order to redistribute the load from one axle to a different axle.

By providing the fuel gas storage capacity of the railway traction vehicle in the form of a set of individual fuel gas storage modules, the capacity can be adequately dimensioned to meet the fuel requirements of the railway line on which the railway traction vehicle is intended to operate. Hence, the railway traction vehicle does not carry any unnecessary weight in the form of superfluous fuel gas storage capacity, which reduces fuel consumption.

Each individual fuel gas storage module on the railway traction vehicle can be viewed as a range extender that extends the railway traction vehicle's cruising range. Accordingly, the cruising range can be easily reduced or extended by removing a module from a receiving device or fitting an additional module into an empty receiving device.

According to preferred embodiments, the inventive railway traction vehicle includes one, several or all of the following features, taken in all technically feasible combinations:
 the fuel gas delivery network including a fuel gas collecting manifold, each fuel gas coupling being connected to the manifold;
 each receiving device is a support frame for supporting one fuel gas storage module;
 the support frames are grouped into one or more support frame assemblies;
 the fuel gas storage assembly is arranged below the floor and/or on the roof of the railway traction vehicle;
 each fuel gas storage module consists of a high pressure vessel, preferably a gas cylinder, and most preferably a hydrogen gas cylinder;
 the power unit is a fuel cell;
 the railway traction vehicle is a regional passenger multiple unit.

BRIEF DESCRIPTION OF THE DRAWINGS

Exemplary embodiments of the invention will now be explained in detail with reference to the appended drawings, wherein:
 FIG. 1 is a side view of a railway traction vehicle according to the present invention;
 FIG. 2 is a perspective top view of the roof of the railway traction vehicle of FIG. 1;

Figure 3:
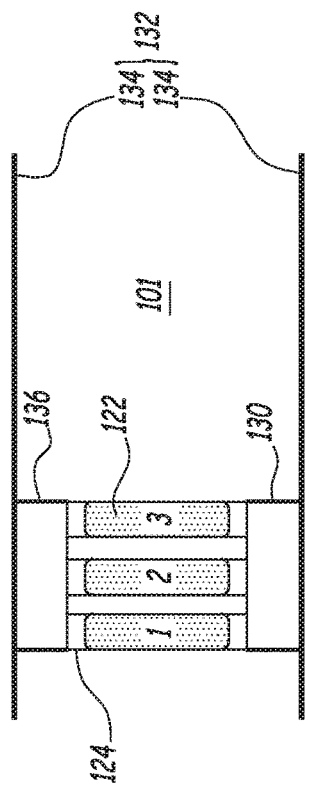
FIGS. 3 and 4 show two examples of possible fuel gas storage arrangements according to the present invention.

DETAILED DESCRIPTION OF THE
PREFERRED EMBODIMENTS

With reference to FIG. 1, there is shown a railway traction vehicle 100 according to the present invention. This railway traction vehicle is a regional passenger multiple unit. It has a roof 101 and a floor 103. It includes a first and a second car 102, 104 that are connected to each other via a transition zone 106. Each car 102, 104 has a traction bogie 108 and a trailer bogie 109. The bogies 108, 109 have axles 110.

The multiple unit's traction power is provided by two fuel cells 112, one on each car 102, 104. The fuel cells 112 operate by converting hydrogen and oxygen into water and electricity. The generated electricity is buffered in batteries (not shown) and then provided to electric traction motors 114 located in the traction bogies 108.

Railway traction vehicle 100 also includes one or more electrical converters 116 for DC or AC conversion of the electrical current.

Two fuel gas storage assemblies 118 are arranged on the railway traction vehicle's roof 101, one on each car 102, 104. In the example of FIG. 1, the fuel gas stored in the fuel gas storage assemblies 118 is hydrogen. However, other fuel gases may also be used, such as liquefied petroleum gas or natural gas.

Hydrogen is delivered to a fuel cell 112 from its associated fuel gas storage assembly 118 via a fuel gas delivery network 120.

Reference is now made to FIG. 2, which provides further detail of the fuel gas storage assemblies 118. Each fuel gas storage assembly 118 comprises a predetermined number of fuel gas storage modules 122, a plurality of identical fuel gas storage module receiving devices 124 and, for each receiving device 124, an identical fuel gas coupling 126.

Preferably, the fuel gas storage modules 122 all have a standard configuration and/or adapted dimensions in order to optimize the energy storage and weight balance for traction purposes. Accordingly, the fuel gas storage modules 122 are interchangeable.

The fuel gas storage modules 122 can either be placed in a transversal or longitudinal position. Preferably, the fuel gas storage modules 122 all are high pressure vessels in a range of 20 MPa to 120 MPa. Preferably, a standard pressure of 35 MPa or 70 MPa is chosen. Furthermore, the volumetric capacity of the fuel gas storage modules 122 and the gas pressure therein are designed such that one module 122 provides the railway traction vehicle 100 with enough fuel gas to travel a certain predetermined average distance, e.g. around 100-200 km.

In the present example, the modules 122 are hydrogen gas cylinders. Each hydrogen gas cylinder 122 has the same cut-off valve and connection port (not shown). The hydrogen is preferably stored in the cylinders 122 at a pressure of 35 or 70 MPa. To withstand the high pressure, the gas cylinders 122 are very sturdy and heavy. In contrast thereto, hydrogen is very light. Thus, most of the weight of a filled gas cylinder 122 comes from the cylinder itself and not from its contents. Typically, the weight of the hydrogen stored in one cylinder is around 5 kg whereas an empty cylinder weighs around 120 kg.

The fuel gas couplings 126 all have the same configuration. The hydrogen gas cylinders' connection ports are connected to the fuel gas couplings 126. Thereby, the hydrogen gas cylinders 122 are connected to the fuel gas delivery network 120. More precisely, the fuel gas delivery network 120 includes a fuel gas collecting manifold 128. The manifold 128 is preferably a collecting pipe that runs along the side of the receiving devices 124. One fuel gas coupling 126 branches off the manifold 128 for each receiving device 124.

Figure 4:
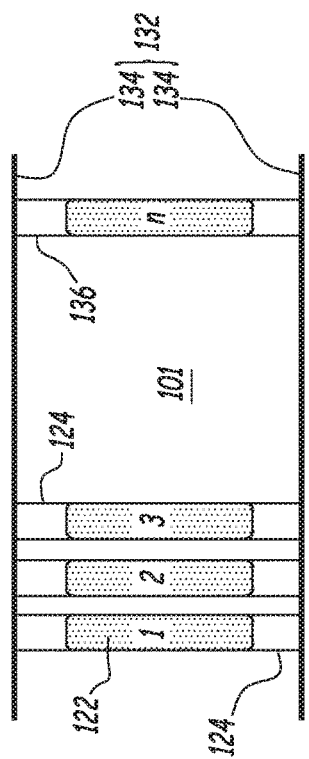

Each receiving device 124 is identical to ensure the interchangeability of the hydrogen gas cylinders 122. The receiving devices 124 may consist of troughs shaped into the roof 101, as shown in FIG. 2. Alternatively, the receiving devices 124 may also consist of a support frame for supporting one hydrogen gas cylinder 122 as shown in FIGS. 3 and 4. The support frames 124 may be individually arranged in a row, as shown in FIG. 3. They may also be grouped into support frame assemblies 130, as shown in FIG. 4. In FIG. 4, three hydrogen gas cylinders 122 and their support frames 124 are assembled together to one assembly 130.

The support frames 124 or the support frame assemblies 130 are connected to the railway traction vehicle's roof 101 via a connecting arrangement 132. Preferably, the connecting arrangement 132 includes two parallel connecting rails 134. The support frames 124 or the support frame assemblies 130 are located between the two connecting rails 134. They are connected to the connecting rails 134 via outer segments 136.

The connecting rails 134 may be fastening rails that fixedly fasten the support frames 124 or the support frame assemblies 130 to the railway traction vehicle's roof 101. Alternatively, the connecting rails 134 may be guiding rails in which the support frames 124 or the support frame assemblies 130 are displaceably guided.

Figure 5:
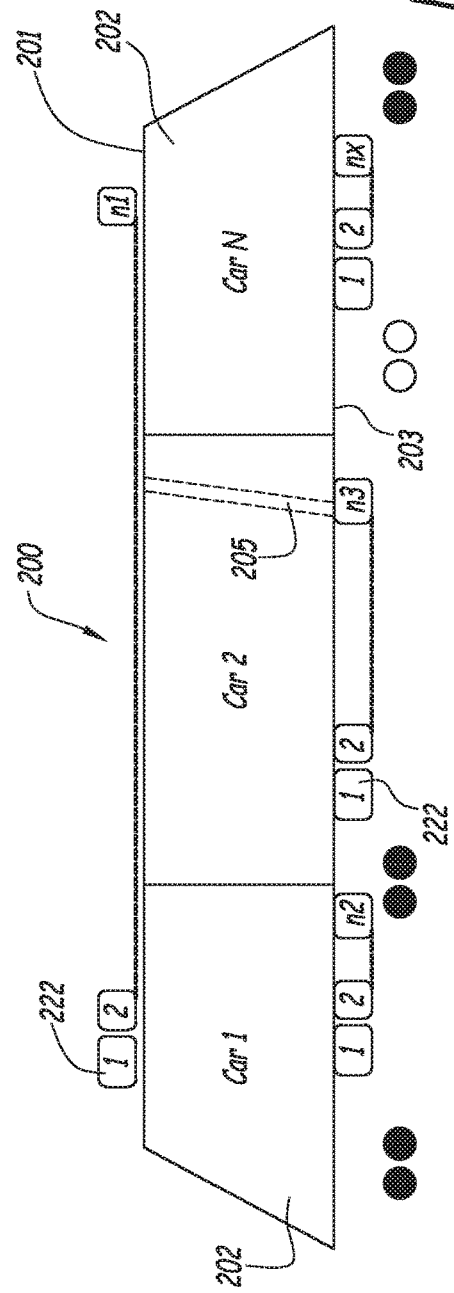
FIG. 5 is a schematic side view of another railway traction vehicle according to the present invention.

FIG. 5 shows a second embodiment 200 of a railway traction vehicle according to the invention. This railway traction vehicle has a number N of cars 202, where N is a natural number between 1 and 3. In this example, the fuel gas storage modules 222 are not only arranged on the roof 201 but also below the floor 203 of the railway traction vehicle 200. More precisely, there is a first number n1 of fuel gas storage modules 222 distributed essentially over the entire length of the railway traction vehicle's roof 201, a second number n2 of fuel gas storage modules 222 arranged below the floor of the first car, a third number n3 of fuel gas storage modules 222 arranged below the floor of the second car, and an xth number nx of fuel gas storage modules 222 arranged below the floor of the Nth car, where n1, n2, n3 and nx are natural numbers.

Preferably, there may be provided a fuel gas connection line 205 allowing fuel gas to flow between the fuel gas storage modules 222 below the floor 203 and the fuel gas storage modules 222 on the roof 201.

A typical application of the inventive modular fuel gas tank 118 is as follows. When producing a new regional passenger multiple unit 100, 200 with fuel gas drive for a predetermined railway line, the number of fuel gas storage modules 122 to be fitted on the multiple unit is chosen as a function of the amount of fuel gas that is needed by the railway traction vehicle 100, 200 to operate on the predetermined railway line.

Then, the chosen number of fuel gas storage modules 122 is distributed over the multiple unit 100, 200 such that the load on the multiple unit's axles 110 is optimised. Thanks to the standardised configuration according to the invention, the distribution of the modules 122 can be easily adjusted, namely by simply switching the modules 122 from one receiving device 124 to another receiving device 124.

Furthermore, if for example a multiple unit 100, 200 no longer operates on the initial railway line but is switched to a different shorter railway line, the number of fuel gas storage modules 122 on the multiple unit can be easily reduced to fit the new railway line, thus reducing the multiple unit's weight and fuel consumption on the new railway line. This is in contrast to prior art fuel gas driven multiple units where their heavy high pressure fuel gas tank is fixedly installed and has a fixed size, meaning that such a prior art multiple unit will waste a lot of fuel on a short railway line for propelling the unneeded capacity of the fuel gas tank.

What is claimed is:

1. A railway traction vehicle comprising:
a plurality of axles;
a power unit adapted to generate at least a part of the vehicle's traction power using fuel gas;
a fuel gas storage assembly adapted to provide fuel gas to the power unit and including a predetermined number of fuel gas storage modules; and
a fuel gas delivery network for delivering fuel gas from the fuel gas storage assembly to the power unit, wherein:
the fuel gas storage assembly comprises:
a plurality of identical fuel gas storage module receiving devices, each receiving device being adapted to receive one fuel gas storage module; and
for each of said receiving devices, an identical fuel gas coupling for coupling a fuel gas storage module received in the receiving device with said fuel gas delivery network,
said fuel gas storage modules:
share a standardized configuration such that each of them can be received in any of said receiving devices and coupled to the corresponding fuel gas coupling, and
are distributed over said fuel gas storage module receiving devices such that the load on the railway traction vehicle's axles is optimized,
said predetermined number of fuel gas storage modules is adapted to the amount of fuel gas needed by the railway traction vehicle to operate on a predetermined railway line, and
the railway traction vehicle includes a guiding arrangement in which the receiving devices are displaceably guided along a longitudinal direction, the longitudinal direction corresponding to the longitudinal direction of the railway traction vehicle, and the guiding arrangement includes two parallel guide rails.

2. The railway traction vehicle of claim 1, wherein the fuel gas delivery network includes a fuel gas collecting manifold, each fuel gas coupling being connected to the manifold.

3. The railway traction vehicle of claim 1, wherein each receiving device is a support frame for supporting one fuel gas storage module.

4. The railway traction vehicle of claim 3, wherein the support frames are grouped into one or more support frame assemblies.

5. The railway traction vehicle of claim 1, wherein the fuel gas storage assembly is arranged below the floor and/or on the roof of the railway traction vehicle.

6. The railway traction vehicle of claim 1, wherein each fuel gas storage module consists of a high pressure vessel.

7. The railway traction vehicle of claim 1, wherein the power unit is a fuel cell.

8. The railway traction vehicle of claim 1, wherein the railway traction vehicle is a regional passenger multiple unit.

9. The railway traction vehicle of claim 6, wherein the high pressure vessel is a gas cylinder.

10. The railway traction vehicle of claim 9, wherein the gas cylinder is a hydrogen gas cylinder.

* * * * *